(12) United States Patent
Uneme et al.

(10) Patent No.: US 6,584,415 B1
(45) Date of Patent: Jun. 24, 2003

(54) METHOD OF CREATING TOOL WEAR DATA, ESTIMATING TOOL WEAR AND JUDGING USE OF TOOL

(75) Inventors: Masayoshi Uneme, Yamatokoriyama (JP); Yasushi Fukaya, Aichi (JP); Sadayuki Matsumiya, Kawasaki (JP); Kazuo Yamazaki, 1500, 7th St. #7-0, Sacramento, CA (US) 95814

(73) Assignees: Mori Seiki Co., Ltd., Yamatokoriyama (JP); Okuma Corporation, Aichi (JP); Mitutoyo Corporation, Kawasaki (JP); Kazuo Yamazaki, Sacramento, CA (US)

( * ) Notice: Subject to any disclaimer, the term of this patent is extended or adjusted under 35 U.S.C. 154(b) by 0 days.

(21) Appl. No.: 09/529,983
(22) PCT Filed: Aug. 28, 1998
(86) PCT No.: PCT/JP98/03835
§ 371 (c)(1),
(2), (4) Date: May 15, 2000
(87) PCT Pub. No.: WO00/12260
PCT Pub. Date: Mar. 9, 2000

(51) Int. Cl.[7] .............................................. G06F 19/00
(52) U.S. Cl. ........................................... 702/34; 702/33
(58) Field of Search ......................... 192/127; 377/15; 409/1; 700/96, 159, 160, 174, 175; 702/34

(56) References Cited

U.S. PATENT DOCUMENTS

| | | | | |
|---|---|---|---|---|
| 3,887,052 A | * | 6/1975 | Del Faro et al. | 192/127 |
| 4,890,306 A | * | 12/1989 | Noda | 377/15 |
| 5,904,457 A | * | 5/1999 | Suwijn et al. | 409/1 |
| 6,266,572 B1 | * | 7/2001 | Yamazaki et al. | 700/96 |

FOREIGN PATENT DOCUMENTS

| | | |
|---|---|---|
| JP | 51-104684 | 9/1976 |
| JP | U-63-197041 | 12/1988 |
| JP | A-64-34639 | 2/1989 |
| JP | A-1-257510 | 10/1989 |
| JP | A-6-155245 | 6/1994 |

* cited by examiner

Primary Examiner—John Bartow
Assistant Examiner—Douglas N Washburn
(74) Attorney, Agent, or Firm—Oliff & Berridge, PLC

(57) ABSTRACT

A tool management method, when performing machining using a Numerical Control (NC) program, searches for cutting tool status information obtained as a result of having performed a machining simulation based on tool information, cutting condition information and the NC program, and on the other hand, actually measures tool wear at the time of actual cutting, estimates the tool wear from each of the items of information described above and judges permission to use a tool.

5 Claims, 12 Drawing Sheets

TOOL DATABASE

| T CODE | WORK ELEMENT NO. | TOOL NAME | MANUFACTURER | HOLDER TYPE NO. | CHIP TYPE NO. | CHIP MATERIAL | NOMINAL DIAMETER | H CODE | D CODE | NO. OF TEETH | TOOTH LENGTH | TOOL LENGTH | PITCH | ANGLE |
|---|---|---|---|---|---|---|---|---|---|---|---|---|---|---|
| 1 | 1 | FACE MILL | ABC COMPANY | A-01 | B-01 | CEMENTED CARBIDE (HARD METAL) | 100.000 | 1 | 1 | 6 | 10.000 | 20 | - | 90 |
| 2 | 9 | CENTER DRILL | ABC COMPANY | A-02 | B-02 | HIGH SPEED STEEL | 3.000 | 2 | 2 | - | 5.000 | 20.000 | - | - |
| 3 | 10 | DRILL | ABC COMPANY | A-03 | B-03 | HIGH SPEED STEEL | 20.000 | 3 | 3 | - | 150.000 | 160.000 | - | 118 |
| 4 | 10 | DRILL | ABC COMPANY | A-04 | B-04 | HIGH SPEED STEEL | 30.000 | 4 | 4 | - | 150.000 | 160.000 | - | 118 |
| 5 | 12 | END MILL | ABC COMPANY | A-05 | B-05 | HIGH SPEED STEEL | 25.000 | 5 | 5 | 2 | 50.000 | 50.000 | - | - |
| 6 | 12 | END MILL | ABC COMPANY | A-06 | B-06 | HIGH SPEED STEEL | 25.000 | 6 | 6 | 2 | 35.000 | 50.000 | - | - |
| 7 | 10 | DRILL | ABC COMPANY | A-07 | B-07 | HIGH SPEED STEEL | 8.200 | 7 | 7 | - | 50.000 | 100.000 | - | - |
| 8 | 14 | CHAMFER | ABC COMPANY | A-08 | B-08 | HIGH SPEED STEEL | 25.000 | 8 | 8 | 2 | 10.000 | 80.000 | - | 45 |
| 9 | 11 | TAP | ABC COMPANY | A-09 | B-09 | HIGH SPEED STEEL | M10 | 9 | 9 | - | 30.000 | 50.000 | 1.25 | 45 |
| 10 | 10 | DRILL | ABC COMPANY | A-10 | B-10 | HIGH SPEED STEEL | 3.000 | 10 | 10 | - | 100.000 | - | - | 118 |
| 11 | 10 | DRILL | ABC COMPANY | A-11 | B-11 | HIGH SPEED STEEL | 5.100 | 11 | 11 | - | 100.000 | - | - | 118 |
| 12 | 10 | DRILL | ABC COMPANY | A-12 | B-12 | HIGH SPEED STEEL | 6.500 | 12 | 12 | - | 100.000 | - | - | 118 |
| 13 | 10 | DRILL | ABC COMPANY | A-13 | B-13 | HIGH SPEED STEEL | 6.800 | 13 | 13 | - | 120.000 | - | - | 118 |
| 14 | 10 | DRILL | ABC COMPANY | A-14 | B-14 | HIGH SPEED STEEL | 8.000 | 14 | 14 | - | 120.00 | - | - | 118 |
| 15 | 10 | DRILL | ABC COMPANY | A-15 | B-15 | HIGH SPEED STEEL | 10.000 | 15 | 15 | - | 120.000 | - | - | 118 |
| 16 | 11 | TAP | ABC COMPANY | A-16 | B-16 | HIGH SPEED STEEL | M8 | 16 | 16 | - | 30.000 | - | 1.25 | - |
| 17 | 11 | TAP | ABC COMPANY | A-17 | B-17 | HIGH SPEED STEEL | M6 | 17 | 17 | - | 30.000 | - | 1.000 | - |
| 18 | 11 | TAP | ABC COMPANY | A-18 | B-18 | HIGH SPEED STEEL | M12 | 18 | 18 | - | 35.000 | - | 1.75 | - |
| 19 | 11 | TAP | ABC COMPANY | A-19 | B-19 | HIGH SPEED STEEL | M14 | 19 | 19 | - | 35.000 | - | 2.0 | - |
| 20 | 12 | END MILL | ABC COMPANY | A-20 | B-20 | HIGH SPEED STEEL | 6.000 | 20 | 20 | 2 | 20.000 | - | - | - |
| 21 | 12 | END MILL | ABC COMPANY | A-21 | B-21 | HIGH SPEED STEEL | 8.000 | 21 | 21 | 2 | 25.000 | - | - | - |
| 22 | 12 | END MILL | ABC COMPANY | A-22 | B-22 | HIGH SPEED STEEL | 10.000 | 22 | 22 | 2 | 25.000 | - | - | - |
| 23 | 12 | END MILL | ABC COMPANY | A-23 | B-23 | HIGH SPEED STEEL | 12.000 | 23 | 23 | 2 | 25.000 | - | - | - |
| 24 | 9 | CENTER DRILL | ABC COMPANY | A-24 | B-24 | HIGH SPEED STEEL | 5.000 | 24 | 24 | - | 3.000 | - | - | - |
| 25 | 9 | CENTER DRILL | ABC COMPANY | A-25 | B-25 | HIGH SPEED STEEL | 1.000 | 25 | 25 | 1 | 3.000 | - | - | - |
| 26 | 14 | CHAMFER | ABC COMPANY | A-26 | B-26 | HIGH SPEED STEEL | 20.000 | 26 | 26 | 2 | 10.000 | - | - | 45 |
| 27 | 12 | END MILL | ABC COMPANY | A-27 | B-27 | HIGH SPEED STEEL | 35.000 | 27 | 27 | 2 | 50.000 | - | - | - |
| 28 | 12 | END MILL | ABC COMPANY | A-28 | B-28 | HIGH SPEED STEEL | 16.000 | 28 | 28 | 2 | 30.000 | - | - | - |
| 29 | 2 | FACE MILL | ABC COMPANY | A-29 | B-29 | HIGH SPEED STEEL | 80.000 | 29 | 29 | 6 | 15.000 | - | - | 45 |
| 30 | 10 | DRILL | ABC COMPANY | A-30 | B-30 | HIGH SPEED STEEL | 21.000 | 30 | 30 | - | 100.000 | - | - | 118 |
| 31 | 10 | DRILL | ABC COMPANY | A-31 | B-31 | HIGH SPEED STEEL | 22.000 | 31 | 31 | - | 100.000 | - | - | 118 |
| 1 | 2 | FACE MILL | ABC COMPANY | A-01 | B-01 | CEMENTED CARBIDE (HARD METAL) | 100.000 | 1 | 1 | 6 | 10.000 | 20 | - | 90 |

Fig. 2

CUTTING CONDITION DATABASE

F1: FEED PER TOOTH  W: WIDTH OF CUT
F2: FEED PER REVOLUTION  H: DEPTH OF CUT

| CUTTING CONDITION NO. | TOOL NO. | WORKPIECE MATERIAL | CUTTING SPEED | F1 | F2 | W | H | COOLANT |
|---|---|---|---|---|---|---|---|---|
| 1 | 1 | FC | 125.6 | 0.1 | - | 80 | 4.9 | PROVIDED |
| 2 | 1 | FC | 188.4 | 0.11 | - | 80 | 0.1 | PROVIDED |
| 3 | 3 | FC | 9.4 | - | 0.1 | - | - | PROVIDED |
| 4 | 4 | FC | 25.1 | - | 0.2 | - | - | PROVIDED |
| 5 | 9 | FC | 28.3 | - | 0.2 | - | - | PROVIDED |
| 6 | 5 | FC | 27.5 | 0.07 | 0.1 | 2.5 | 19.9 | PROVIDED |
| 7 | 6 | FC | 39.2 | 0.1 | 0.1 | 0.1 | 0.1 | PROVIDED |
| 8 | 2 | FC | 25.7 | - | 0.15 | - | - | NOT PROVIDED |
| 9 | | FC | 25 | - | 0.1 | - | - | NOT PROVIDED |
| 10 | | FC | 10 | - | - | - | - | NOT PROVIDED |

Fig. 3

CUTTING STATUS DATABASE

CUTTING EDGE POINT: NUMBER OF COLLISION WITH WORK

| CUTTING CONDITION NO. | CUTTING EDGE POINT 1 | CUTTING EDGE POINT 2 | CUTTING EDGE POINT 3 | CUTTING EDGE POINT 4 | CUTTING EDGE POINT 5 | CUTTING TIME | CUTTING DISTANCE |
|---|---|---|---|---|---|---|---|
| 1 | 10020 | 10254 | 10280 | 10281 | 8245 | 0:10:25 | 1000 |
| 2 | 21045 | 2251 | 22512 | 22512 | 18465 | 0:20:15 | 1500 |
| 3 | 10425 | 10245 | 10341 | 15420 | 11024 | 0:03:20 | 1100 |
| 4 | 30124 | 32514 | 36544 | 32120 | 32120 | 0:05:58 | 500 |
| 5 | 10452 | 10245 | 14210 | 12452 | 10342 | 0:06:30 | 500 |
| 6 | 22101 | 22321 | 22314 | 21000 | 18754 | 0:20:31 | 3000 |
| 7 | 10245 | 12221 | 13212 | 12121 | 74545 | 0:35:02 | 800 |
| 8 | 36452 | 36412 | 36412 | 36545 | 32565 | 0:03:56 | 250 |
| 9 | 12451 | 12451 | 12451 | 12451 | 8456 | 0:07:21 | 600 |
| 10 | 22541 | 22654 | 22142 | 15412 | 120 | 0:15:41 | 800 |

Fig. 4

WEAR DATABASE

| CUTTING CONDITION | CUTTING LENGTH m | WEAR mm |
|---|---|---|
| 2 | 2 | 0.05 |
| 2 | 5 | 0.07 |
| 2 | 7 | 0.08 |
| 2 | 10 | 0.1 |
| 2 | 12 | 0.12 |
| 2 | 15 | 0.14 |
| 3 | 17 | 0.14 |
| 3 | 20 | 0.15 |
| 3 | 2 | 0.05 |
| 3 | 5 | 0.07 |
| 3 | 7 | 0.08 |
| 4 | 10 | 0.1 |
| 4 | 12 | 0.12 |
| 4 | 15 | 0.14 |
| 4 | 17 | 0.14 |
| 4 | 20 | 0.15 |
| 6 | 2 | 0.05 |
| 6 | 5 | 0.07 |
| 6 | 7 | 0.08 |
| 6 | 10 | 0.1 |
| 6 | 12 | 0.12 |
| 6 | 15 | 0.14 |
| 6 | 17 | 0.14 |
| 6 | 20 | 0.15 |

Fig. 5

MACHINE SURFACE ROUGHNESS DATABASE

| CUTTING CONDITION NO. | CUTTING LENGTH m | SURFACE ROUGHNESS μm |
|---|---|---|
| 1 | 1 | 19 |
| 1 | 2 | 20 |
| 1 | 3 | 23 |
| 1 | 4 | 25 |
| 1 | 5 | 27 |
| 1 | 6 | 30 |
| 1 | 7 | 34 |
| 2 | 1 | 19 |
| 2 | 2 | 20 |
| 2 | 3 | 23 |
| 2 | 4 | 25 |
| 2 | 5 | 27 |
| 2 | 6 | 30 |
| 2 | 7 | 34 |
| 3 | 1 | 19 |
| 3 | 2 | 20 |
| 3 | 3 | 23 |
| 3 | 4 | 25 |
| 3 | 5 | 27 |
| 3 | 6 | 30 |
| 3 | 7 | 34 |
| 4 | 1 | 19 |
| 4 | 2 | 20 |
| 4 | 3 | 23 |
| 4 | 4 | 25 |
| 4 | 5 | 27 |
| 4 | 6 | 30 |
| 4 | 7 | 34 |

Fig. 7

LIFE DATABASE

| T CODE | WEAR (mm) | LIFE WEAR (mm) | NO. OF COLLISION (TIMES) | NO. OF LIFE COLLISION (TIMES) | STATE |
|---|---|---|---|---|---|
| 1 | 0.04 | 0.18 | 20222 | 100000 | OK |
| 2 | 0.01 | 0.16 | 50044 | 1000000 | OK |
| 3 | 0.02 | 0.12 | 2995 | 100000 | OK |
| 4 | 0.02 | 0.21 | 2700 | 100000 | OK |
| 5 | 0.07 | 0.22 | 12300 | 100000 | OK |
| 6 | 0.02 | 0.18 | 10338 | 100000 | OK |
| 7 | 0.02 | 0.17 | 22635 | 100000 | OK |
| 8 | 0.01 | 0.11 | 31991 | 1000000 | OK |
| 9 | 0.01 | 0.09 | 5066 | 50000 | OK |
| 10 | 0.02 | 0.18 | 6875 | 100000 | OK |
| 11 | 0.02 | 0.16 | 3893 | 100000 | OK |
| 12 | 0.02 | 0.12 | 11250 | 100000 | OK |
| 13 | 0.02 | 0.21 | 12296 | 100000 | OK |
| 14 | 0.02 | 0.22 | 15630 | 100000 | OK |
| 15 | 0.02 | 0.18 | 13347 | 100000 | OK |
| 16 | 0.01 | 0.17 | 3099 | 50000 | OK |
| 17 | 0.01 | 0.11 | 4285 | 50000 | OK |
| 18 | 0.01 | 0.09 | 3766 | 50000 | OK |
| 19 | 0.01 | 0.18 | 3545 | 50000 | OK |
| 20 | 0.06 | 0.16 | 13059 | 100000 | OK |
| 21 | 0.05 | 0.12 | 15267 | 100000 | OK |
| 22 | 0.08 | 0.21 | 30624 | 100000 | OK |
| 23 | 0.09 | 0.22 | 35688 | 100000 | OK |
| 24 | 0 | 0.18 | 296 | 1000000 | OK |
| 25 | 0 | 0.17 | 103 | 1000000 | OK |
| 26 | 0 | 0.11 | 2066 | 1000000 | OK |
| 27 | 0.02 | 0.09 | 1965 | 100000 | OK |
| 28 | 0.03 | 0.18 | 3896 | 100000 | OK |
| 29 | 0.05 | 0.17 | 10068 | 100000 | OK |
| 30 | 0.01 | 0.11 | 666 | 100000 | OK |
| 31 | 0.01 | 0.09 | 598 | 100000 | OK |

Fig. 9

SAMPLE NC PROGRAM

| | | | |
|---|---|---|---|
| 1 | O 0001 | 33 | N2(CENTER DRILL) |
| 2 | G90 G80 G40 | 34 | G90 G54 G0 X70. Y50. S1000 M3 T3 |
| 3 | G91 G28 Z0 | 35 | G43 Z50. H2 M8 |
| 4 | T1 | 36 | G99 G81 Z-3. R2. F100 |
| 5 | M6 | 37 | X-70. |
| 6 | N1(FACE MILL 100mm DIA.) | 38 | Y-50. |
| 7 | G90 G54 G0 X160. Y50. S400 M3 T2 | 39 | X70. |
| 8 | G43 Z50. H1 M8 | 40 | X30. Y0 |
| 9 | G1 Z.1 F2000 | 41 | G0 Z100. |
| 10 | X-160. F250 | 42 | G90 G55 G0 X40. Y0 |
| 11 | G0 Y-45. | 43 | Z50. |
| 12 | G1 X160. | 44 | G99 G81 Z-3. R2. F100 |
| 13 | G0 Y50. S600 | 45 | X-40. |
| 14 | G1 Z0 | 46 | G0 Z50. M9 |
| 15 | X-160. F400 | 47 | G91 G28 Z0 M6 |
| 16 | G0 Y-45. | 48 | M1 |
| 17 | G1 X160. | | |
| 18 | G0 Z100. | 49 | N3(DRILL 20mm DIA.) |
| 19 | G55 G0 X160. Y50. S400 | 50 | G90 G54 G0 X70. Y50. S400 M3 T4 |
| 20 | Z50. | 51 | G43 Z50. H3 M8 |
| 21 | G1 Z.1 F2000 | 52 | G99 G81 Z-25. R2. F80 |
| 22 | X-160. F250 | 53 | X-70. |
| 23 | G0 Y-45. | 54 | Y-50. |
| 24 | G1 X160. | 55 | X70. |
| 25 | G0 Y50. S600 | 56 | G0 Z50. M9 |
| 26 | G1 Z0 | 57 | G91 G28 Z0 M6 |
| 27 | X-160. F400 | 58 | M1 |
| 28 | G0 Y-45. | | |
| 29 | G1 X160. | 59 | N4(DRILL 30mm DIA.) |
| 30 | G0 Z50. M9 | 60 | G90 G54 G0 X30. Y0 S300 M3 T5 |
| 31 | G91 G28 Z0 M6 | 61 | G43 Z100. H4 M8 |
| 32 | M1 | 62 | G98 G81 Z-19.9 R2,F60 |
| | | 63 | G55 G0 X40. Y0 |
| | | 64 | Z50. |
| | | 65 | G99 G81 Z-21. R2. F60 |
| | | 66 | X-40 |

Fig. 10A

| | | | |
|---|---|---|---|
| 67 | G0 Z50. M9 | 101 | G43 Z50.  H6 M8 |
| 68 | G91 G28 Z0 M6 | 102 | G1 Z-19. F2000 |
| 69 | M1 | 103 | Z-20. F50 |
| | | 104 | G41 Y20. D6 |
| 70 | N5(END MILL 25mm DIA. ROUGH) | 105 | G1 X-30. |
| 71 | G90 G54 G0 X30. Y0 S350 M3 T6 | 106 | G3 Y-20. R20. |
| 72 | G1 Z50. H5 M8 | 107 | G1 X30. |
| 73 | G1 Z-10. F2000 | 108 | G3 Y20. R20. |
| 74 | Z-19.9 F35 | 109 | G40 G1 Y0 F200 |
| 75 | G41 X-50. F50 D5 | 110 | G0 Z50. M9 |
| 76 | G3 X-30. Y-20. R20. | 111 | G91 G28 Z0 M6 |
| 77 | G1 X30. | 112 | M1 |
| 78 | G3 Y20. R20. | | |
| 79 | G1 X-30. | 113 | N7(DRILL 8.2mm) |
| 80 | G3 X-50. Y0 R20. | 114 | G90 G55 G0 X40. Y0 S1000 M3 T8 |
| 81 | G40 G1 X-30. F200 | 115 | G43 Z50. H7 M8 |
| 82 | G0 Z100. | 116 | G98 G81 Z-45. R-19. F150 |
| 83 | G55 G0 X40. Y0 | 117 | X-40. |
| 84 | G1 Z-10. F2000 | 118 | G0 Z50. M9 |
| 85 | Z-20. F35 | 119 | G91 G28 Z0 M6 |
| 86 | F41 X20. D15 | 120 | M1 |
| 87 | G3 I20. F50 | | |
| 88 | G40 G1 X40. | 121 | N8(CHAMFER 25mm DIA.) |
| 89 | G0 Z10. | 122 | G90 G54 G0 X70. Y50. S500 M3 T9 |
| 90 | G90 X-40. | 123 | G43 Z10. H8 M8 |
| 91 | G1 Z-10. F2000 | 124 | G98 G81 Z-11. R-8. F50 |
| 92 | Z-20. F35 | 125 | X-70. |
| 93 | G41 X-60. D15 | 126 | X-50. |
| 94 | G3 I20. F50 | 127 | X70. |
| 95 | G40 G1 X-40. | 128 | G0 Z100. |
| 96 | G0 Z10.   M9 | 129 | G55 G0 X40. Y0 S800 |
| 97 | G91 G28 Z0 M6 | 130 | Z10. |
| 98 | M1 | 131 | G98 G81 Z-25. R-22. F80 |
| | | 132 | X-40. |
| 99 | N6(END MILL 25mm DIA. FINISH) | 133 | G0 Z50. M9 |
| 100 | G90 G54 G0 X30. Y0 S500 M3 T7 | 134 | G91 G28 Z0 M6 |

136  N9(TAP M10 P1.25)
137  G90 G55 G0 X40. Y0 T1
138  G43 Z10. H9 M8
139  M29 S320
140  G98 G84 Z-40. R-10. F400
141      X-40.
142  G0 Z50. M9
143  G91 G28 Y0 Z0 M6
144  M30
```

Fig. 10C

METHOD OF CREATING TOOL WEAR DATA, ESTIMATING TOOL WEAR AND JUDGING USE OF TOOL

TECHNICAL FIELD

The present invention relates to a method of creating, at the time of performing machining of a workpiece in accordance with an NC program, wear data of a tool used, estimating tool wear in necessary machining and judging whether a tool selected in relation to this machining may be used or not, and more particularly to an improved method of mutually associating machining and tool wear, estimating tool wear by an adaptively controlled simulation, comparing and calibrating this estimated wear as an actual measurement value and performing life control by comparing this wear with the life database of a tool.

BACKGROUND ART

Conventionally, at the time when machining a workpiece using an NC program, human beings have looked at a tool with their eyes, checked the state of the tool wear, forecast the life of the tool, discerned a cutting sound during machining or the surface roughness after machining and forecast the life. Then, from this forecast they have judged whether the tool is used or not. Further, in a machine tool controller having a tool life control function, the usability of the tool has been judged using the function. The conventional life control function has used a control method of estimating the life of a tool on the basis of only the cutting time, use frequency and cutting distance of the tool, counted the cutting time, use frequency and cutting distance of a tool being used, during machining on a real-time basis, judged that life was exhausted when the data reached a predetermined value and automatically performed such an operation as changing the used tool with another tool. Although the predetermined value is written in tool catalogs by a tool manufacturer based on test data under a certain condition, the data is not consistent under all cutting conditions and the value is merely an estimate.

Further, relying only on a forecast by a conventional worker, its criteria are ambiguous and even a skillful worker cannot accurately forecast the life. As a result, tool damage and chipping might have occurred during machining.

Furthermore, according to the life control function, if a predetermined value is standardized, it was possible to prevent tool damage to some extent with a fixed probability regardless of the level of skill of a worker. However, because a forecast is impossible, it cannot be prevented that useful life of the tool will run out during machining. As a result, in the same manner as before, tool damage and chipping might have occurred during machining.

The present invention proposes an improved tool management method of forecasting the life of a tool with good accuracy in a simulation level before real machining and preventing tool damage and chipping from arising.

DISCLOSURE OF THE INVENTION

The present invention is intended to solve the problems described above, and comprises the steps of extracting tool information and cutting condition information from an NC program, obtaining cutting status information from a machining simulation based on the NC program, actually measuring tool wear at the time of actual cutting, and creating a tool wear database in which a tool cutting length and the tool wear are associated based on the information obtained from each of the steps described above.

Further, the present invention comprises the steps of extracting tool information and cutting condition information from an NC program, obtaining cutting status information from a machining simulation based on the NC program, measuring the surface roughness of an actually cut workpiece, and creating a tool wear database in which a tool cutting length and the tool wear were associated based on the information obtained from each of the steps described above.

Furthermore, the present invention comprises the steps of extracting tool information and cutting condition information from an NC program, obtaining cutting status information from a machining simulation based the NC program, actually measuring tool wear during actual cutting, creating a tool wear database in which a tool cutting length and the tool wear are associated based on the information obtained from each of the steps described above, and estimating the tool wear at the time when the relevant machining was performed using the tool wear database before actual machining is performed.

Moreover, the present invention comprises the steps of extracting tool information and cutting condition information from an NC program, obtaining cutting status information from a machining simulation based of the NC program, actually measuring tool wear at the time of actual cutting, creating a tool wear database containing a tool cutting length and the tool wear based on the information obtained from each of the steps described above, estimating the tool wear at the time when the relevant machining was performed using the tool wear database before actual machining is performed, and granting permission for actual machining by comparing the estimated tool wear and the tool life database.

As described above, according to the present invention, waste of a tool is suppressed by extending the life of the tool as far as possible, and improvement in productivity due to reduction of defective work caused by tool damage during machining and improvement in quality due to consistency of surface roughness can be promoted.

BRIEF DESCRIPTION OF DRAWINGS

FIG. 2 is a diagram showing an example of a tool database used in the present invention;

FIG. 3 is a diagram showing an example of a cutting condition used in the present invention;

FIG. 4 is a diagram of a cutting status database used in the present invention;

FIG. 5 is a diagram of the wear database used in the present invention;

FIG. 7 is a diagram showing an example of a machining surface roughness database used in the present invention;

FIG. 9 is a diagram showing an example of a tool life database; and

FIG. 10A, FIG. 10B or FIG. 10C is a diagram of the NC program in a preferred embodiment of the present invention.

BEST MODE FOR CARRYING OUT THE INVENTION

A block diagram of the overall configuration of a preferred embodiment to which a tool management method related to the present invention was applied.

Figure 1:
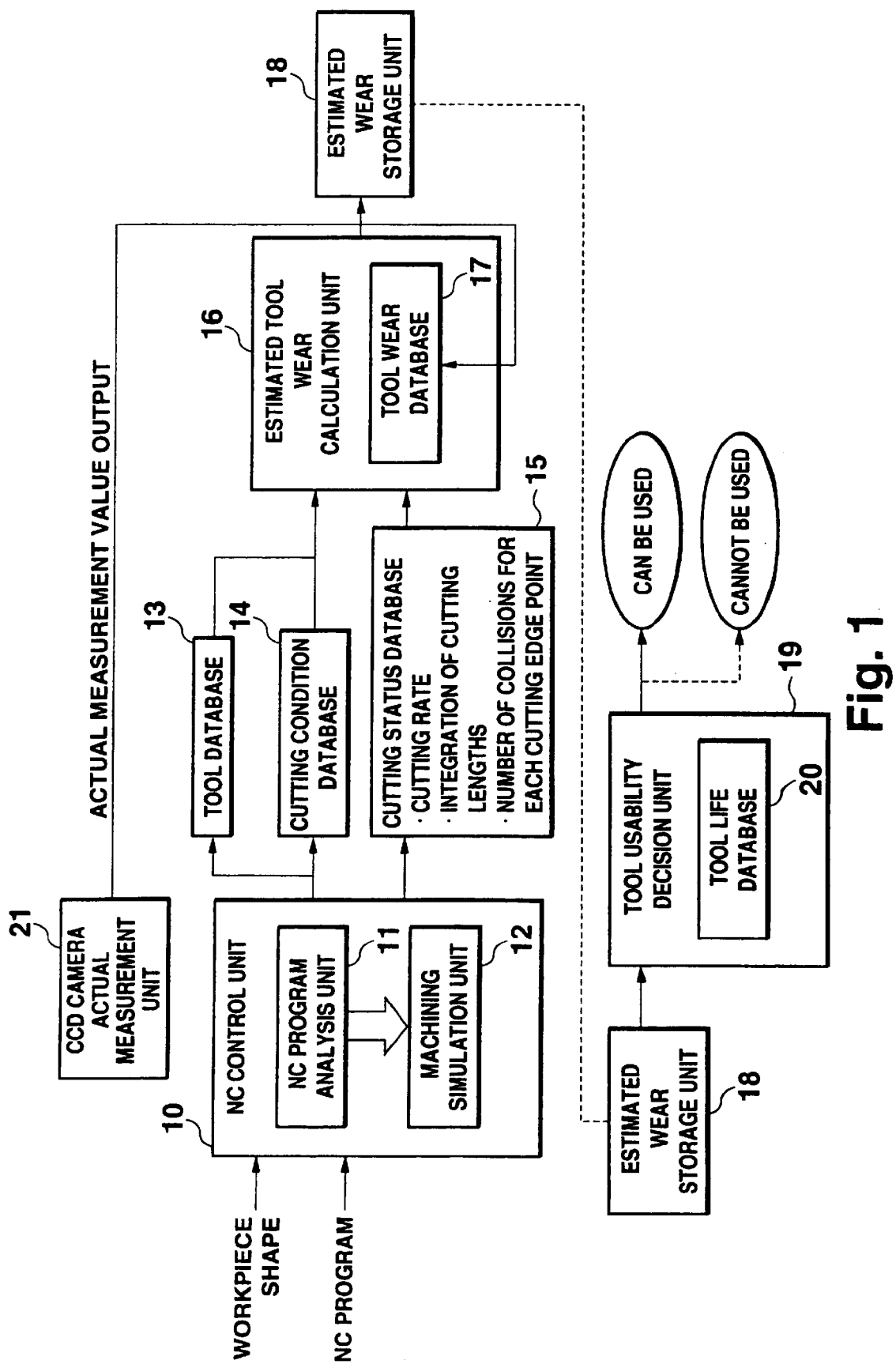
FIG. 1 is a block diagram showing a preferred embodiment of a tool management method related to the present invention.

In FIG. 1, a workpiece shape and an NC program for performing necessary machining are input to an NC control unit 10. The NC control unit 10 includes an NC program analysis unit 11 and a machining simulation unit 12. The NC program analysis unit 11 analyzes the NC program and the workpiece shape, extracts tool information and cutting condition information, outputs these information to a tool database 13 and a cutting condition database 14 and stores them. The analysis of the tool information and the cutting condition information by the NC program analysis unit 11 is disclosed in the PCT/JP96/03264 application applied for by this applicant on Nov. 7, 1996. In this conventional application, the know-how (technical knowledge) in a machining field is added to the extracted tool information and the cutting condition information and is reflected in an NC program. In the present invention, the NC program analysis unit 11 stores the tool information and the cutting condition information in each of the databases 13 and 14 as they are simply extracted from both the workpiece shape and NC program. An example of the tool information stored in the tool database 13 is shown in FIG. 2 and an example of the cutting condition information stored in the cutting condition database 14 is shown in FIG. 3.

Further, the machining simulation unit 12 is installed in the NC control unit 10. After the input workpiece shape and NC program have been analyzed by the NC program analysis unit 11, necessary information is sent to the machining simulation unit 12 and in the machining simulation unit 12, the machining status information having the cutting rate, integration of cutting lengths and number of collision times for each cutter edge point is created without performing actual machining. This machining status information is sent from the machining simulation unit 12 to a cutting status database 15 and each item of information described previously is stored. The simulation operation of the machining simulation unit 12 is disclosed in the PCT/JP96/03266 application applied for by this applicant on Nov. 7, 1996. Accordingly, before practically necessary machining is performed, the cutting status in the relevant machining, in particularly, the necessary information about tool wear, is stored in the database 15. An example of this cutting status database 15 is shown in FIG. 4.

The various items of information from the tool database 13, the cutting condition database 14 and the cutting status database 15 are sent to an estimated tool wear calculation unit 16 and the tool wear, that is, a peripheral cutter relief surface wear width, diameter reduction wear and bottom corner wear at the time when machining was performed by a given NC program can be obtained. Besides, a desirable wear constant in relation to the tool wear can be decided in accordance with the tool information and the cutting condition information. Such wear and wear constant are stored in a tool wear database 17 installed in the calculation unit 16. In the same manner as the tool database 13, the cutting condition database 14 and the cutting status database 15, this tool wear database 17 is also provided with a rewritable storage function and can sequentially store necessary information in accordance with the condition supplied to the NC control unit 10.

It constitutes a characteristic feature of the present invention that in addition to the tool information and the cutting condition information extracted based on the NC program described previously and the cutting status information obtained by a machining simulation, the actual cutting tool wear obtained at the time of actual machining is reflected in the tool wear database 17, and therefore, an actual measurement unit 21 which uses CCD cameras is provided in the vicinity of the machining portion of a numerically controlled machine tool. In this actual measurement unit 21, it is acceptable that the wear of a tool in all machining processes is actually measured or an actual measurement is also made only at necessary machining. Further, the actual measurement unit 21 not only measures the necessary wear of the tool but is also used to actually measure the surface roughness of a machined workpiece. These tool wear and the actual measurement values of the surface roughness of the workpiece are supplied to the tool wear database 17.

Accordingly, in the tool wear database 17, the wear and wear constant by the machining simulation described above and practical wear can be compared. If a predetermined allowable value exceeds this comparison value, the constant under the condition is reflected in the tool wear database 17 and the wear and wear constant are corrected.

Consequently, according to the present invention, at each stage of machining, the estimation of wear can be performed before actual machining is performed, and each time practical machining is performed, a tool wear estimate value is corrected and the tool wear database 17 which is adapted to the practical machining can be created.

Figure 6:
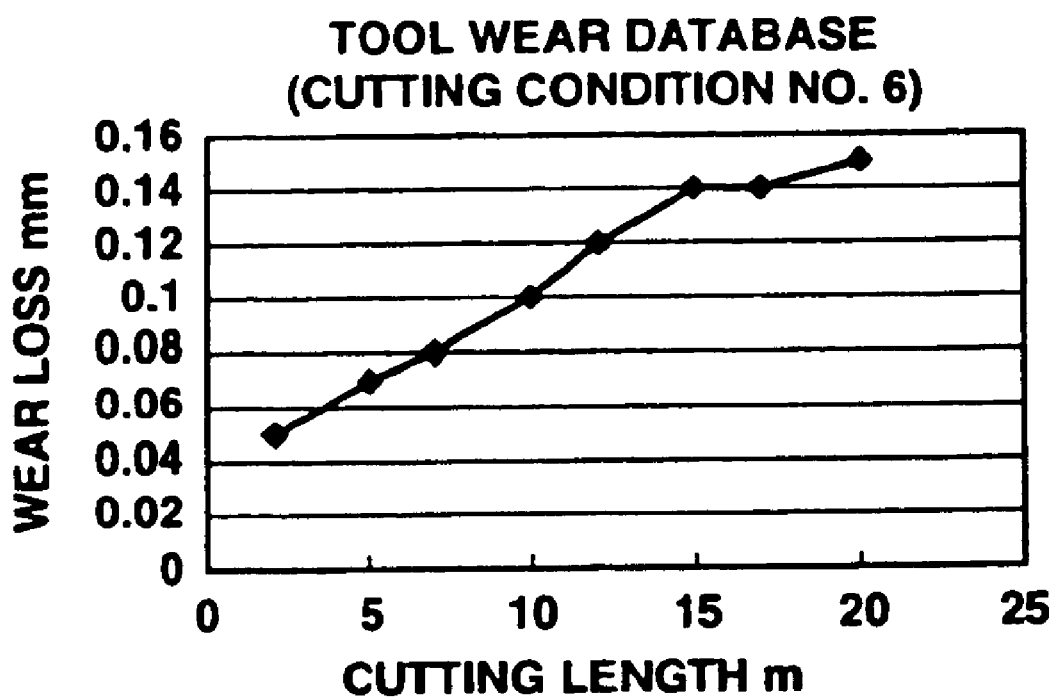
FIG. 6 is a graph showing the relationship between a cutting length and wear plotted from the wear database of FIG. 5.

Thus, an example of the tool wear database 17 generated from an NC program, a machining simulation and a machining actual measurement value is shown in FIG. 5, and according to this example, the wear in relation to the cutting length of a tool is shown as the information in which the actual measurement value was reflected. This wear database is then output as the wear of a specific tool in relation to the cutting length as shown in FIG. 6 and it becomes clear that the wear trace shown in FIG. 6 is followed under the specific cutting conditions of the specific tool.

Further, the machining surface roughness database of a workpiece is also stored in the tool wear database 17. An example of this database is shown in FIG. 7 and a change of the surface roughness in relation to the cutting length under the specific cutting conditions of the specific tool is stored as information.

Figure 8:
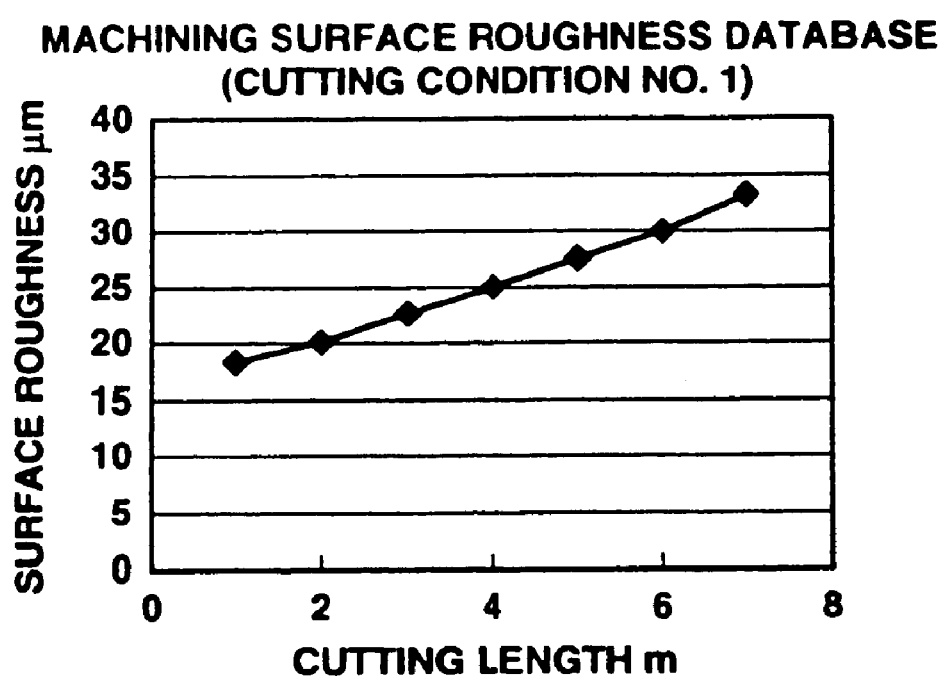
FIG. 8 is a diagram showing an example of the surface roughness for a cutting length from the machining surface roughness database shown in FIG. 7, in a graph.

In FIG. 8, a change of the surface roughness in relation to the cutting length in the specific cutting conditions of the specific tool is graphically shown, and it is thereby clearly understood that the surface roughness of a workpiece deteriorates in accordance with the time in which a tool is used.

Furthermore, according to the present invention, when subsequent NC machining is performed in accordance with the contents of the tool wear database 17 created in this manner, the tool wear can be previously estimated with high precision.

In FIG. 1, the information about the tool wear database 17 of the estimated tool wear calculation unit 16 is stored in an estimated wear storage unit 18, and the estimated wear of a tool at the time when NC machining is performed is extracted by an individual NC program. Accordingly, a far more accurate estimated tool wear than with a forecast of the visual inspection by a conventional worker or a numerical controller having a life control function can be known.

In the present invention, further, the information of the estimated wear storage unit 18 is sent to a usability decision unit 19 and is compared with the information of a tool life database 20 installed in this decision unit 19, and then the judgment as to whether a tool which will be used later is suitable for the machining specified by an NC program is performed. The tool life database 20 is usually supplied from a tool manufacturer and an example of the database is shown in FIG. 9.

In the present invention, the estimated wear of the tool described above, that is, the information stored in the estimated wear storage unit 18, is compared with the tool life database 20 supplied from a tool manufacturer and the judgment for the permission of using the tool can be performed.

The tool usability decision unit 19, as shown in FIG. 9, compares estimated wear against the life database supplied from a tool manufacturer to decide the usability of the tool. In FIG. 9, because the use frequency of a tool is low, the permission to use the tool is granted for all of T codes 1 to 31. Besides, as shown clearly in FIG. 9, for tool wear, the wear of a tool itself and the number of collision times between the tool and a workpiece in each setting point are adopted as wear data. In FIG. 9, if the tool wear or the number of collision times exceed each span of life, the use of the relevant tool is rejected.

In the present invention, the usability of the tool described above can be decided for each process, and as occasion demands, can also be decided in a blocked state in which several processes are combined.

Further, according to the present, as shown in FIG. 8 described above, estimated surface roughness is calculated based on a machining surface roughness data base. The estimated surface roughness at the time of machining is performed by the tool before the machining process is displayed on a screen and the usability of the tool can also be notified to the operator of the machine.

FIG. 10A, FIG. 10B or FIG. 10C shows an example of an NC program in NC machining, and a tool management method in which the present invention was applied to such an NC program is described specifically below.

(1) If the 60th block is executed while a sample NC program is being executed (during machining), when T5 (T indicates tool) is instructed, the block actually machined by T5 is retrieved. Subsequently, the sample NC program is analyzed by one block and it is checked whether or not M6 (M6 indicates tool change) can be found. Because the M6 command can be found on the 68th line, it is judged that T5 is executed from the 69th line.

(2) Next, the program is further analyzed by one block as shown below. Because T6 can be found on the 71st line, it can be judged that T5 is executed until the next M6 is reached. Then, the program is analyzed by one block and M6 is detected on the 97th line.

(3) In the above, it can be judged that T5 performs machining between the 69th and 97th lines.

(4) Next, the block from the 69th line to 97th line is transferred to the NC program analysis unit 11 and the machining simulation unit 12.

(5) The block of the cutting condition No. 6 of FIG. 3 (cutting condition data) is output from the NC program analysis unit 11. Further, the block connected with the cutting condition No. 6 of FIG. 4 (cutting status database) is output from the machining simulation unit 12.

(6) It is known from the life database of FIG. 5 that the wear of T5 is currently 0.07 mm.

(7) Next, the item of the cutting condition No. 6 is extracted from the wear database of FIG. 5, and it is known that the cutting length of wear 0.07 mm is five meters.

(8) Because the cutting length connected with the cutting condition No. 6 output from the simulation unit 12 in item (5) is three meters, it reaches eight meters if the cutting length is totaled with the cutting length up to the present obtained in item (7). It can be judged from the wear database graph of FIG. 6 that the wear of the cutting length eight meters is 0.09 mm. Hence, estimated wear reaches 0.09 mm.

Next, the number of collisions is described.

(9) In the block connected with the cutting condition No. 6 of FIG. 4 (cutting status database) of item (5) described previously, it is known that the maximum value is 22,321 collisions for each cutter edge point. Because the current number of collisions in T5 of the life database of FIG. 9 is 12,300, the sum reaches 34,621.

(10) The estimated wear or number of estimated collisions of items (8) and (9) described previously and the life wear or number of life collisions in T5 of a life database are compared and whether the estimated wear does not reach the life wear or whether the number of estimated collisions does not reach the number of life collisions is judged. If both are not reached, it is judged that they can be used for machining. If both are reached, a message is displayed and machining is temporarily stopped at M6 when a tool is practically changed for T5 while T5 is practically changed by a tool by M6 or if a preliminary tool is registered, the preliminary tool is called and machining is performed using the preliminary tool.

What is claimed is:

1. A tool wear data creation method, comprising the steps of:

extracting tool information and cutting condition information from an NC program;

obtaining cutting status information from a machining simulation based on the NC program;

actually measuring tool wear at the time of actual cutting; and creating a tool wear database in which a tool cutting length and the tool wear are associated based on the information obtained from each of said steps.

2. A tool wear data creation method, comprising the steps of:

extracting tool information and cutting condition information from an NC program;

obtaining cutting status information from a machining simulation based on the NC program;

measuring the surface roughness of an actually cut workpiece; and creating a tool wear database in which a tool cutting length and tool wear are associated based on the information obtained from each of said steps.

3. A tool wear estimation method, comprising the steps of:

extracting tool information and cutting condition information from an NC program;

obtaining cutting status information from a machining simulation based the NC program;

actually measuring tool wear at the time of actual cutting;

creating a tool wear database in which a tool cutting length and the tool wear based on the information are associated based on the information from each of said steps: and estimating the tool wear using the tool wear database at the time when the relevant machining was performed before actual machining is performed.

4. A tool use judgment method, comprising the steps of:

extracting tool information and cutting condition information from an NC program;

obtaining cutting condition information from a machining simulation based on the NC program;

actually measuring tool wear at the time of actual cutting;

creating a tool wear database in which a tool cutting length and the tool wear based on the information obtained from each of said steps;

estimating the tool wear using the tool wear database at the time when the relevant machining was performed before actual machining is performed; and comparing estimated tool wear and a tool life database and granting permission for actual machining.

5. A storage medium storing a tool wear data creation program, comprising the steps of:

extracting tool information and cutting condition information from an NC program;

obtaining cutting status information from a machining simulation based on the NC program;

actually measuring tool wear at the time of actual cutting; and creating a tool wear database in which a tool cutting length and the tool wear are associated based on the information obtained from each of said steps.

* * * * *